Oct. 3, 1972     M. W. PERGA     3,695,851

EXHAUST GAS CATALYTIC CONVERTER

Filed Oct. 26, 1970

INVENTOR:
Martin W. Perga

BY:
*James R. Hoatson, Jr.*
*Philip T. Liggett*
ATTORNEYS

United States Patent Office 3,695,851
Patented Oct. 3, 1972

3,695,851
EXHAUST GAS CATALYTIC CONVERTER
Martin W. Perga, Hoffman Estates, Ill., assignor to Universal Oil Products Company, Des Plaines, Ill.
Continuation-in-part of application Ser. No. 795,122, Jan. 29, 1969. This application Oct. 26, 1970, Ser. No. 84,013
The portion of the term of the patent subsequent to Mar. 2, 1988, has been disclaimed
Int. Cl. B01j *9/04;* F01n *3/14*
U.S. Cl. 23—288 F                4 Claims

ABSTRACT OF THE DISCLOSURE

In a catalytic converter unit for a gaseous stream having a fixed bed of catalyst particles, the improved construction which uses a pair of uniformly spaced apart perforated members to support the catalyst therebetween and each of the perforated members is of a dished design. The member adjacent the gas inlet section is concave with respect to the catalyst and the downstream member is such as to be convex inwardly toward the particles, such that the particles will be held in a tight non-settling manner when the unit is subjected to expansion from high temperature catalytic conversion of the gas stream.

---

Figure 1:
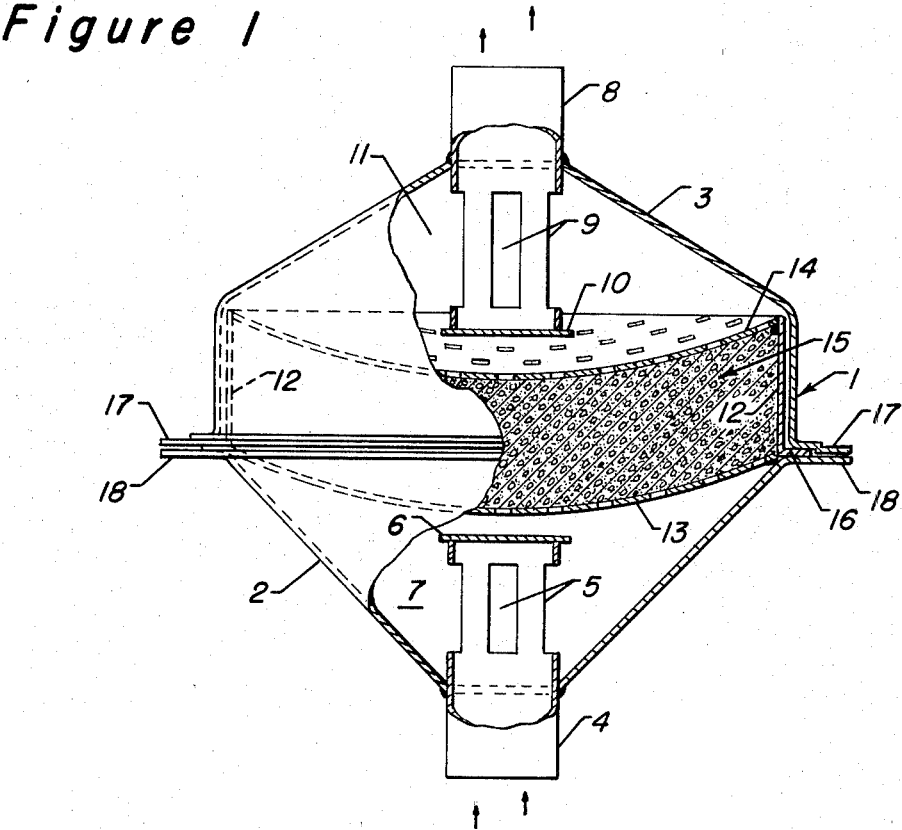

The present application is a continuation-in-part of my copending application Ser. No. 795,122, filed Jan. 29, 1969, now issued as U.S. Pat. 3,567,403, issued Mar. 2, 1971.

The present invention relates to an improved form of exhaust gas converter design which overcomes catalyst particle settling and thus tends to maintain a tightly packed particle bed. More specifically, the invention is directed to a converter design which maintains a fixed bed of catalyst and has the catalyst support screens bowed in a manner so that temperature expansion will be in a known controlled direction and, at the same time, will keep the catalyst particles in a substantially compact bed.

The typical or conventional design for catalytic converter units which may be used for the treatment of automobile exhaust gases have utilized screens or perforated plates to retain catalyst pills, beads, etc. in an internal fixed bed through which the exhaust gas stream can pass and be treated. However, the usual designs, with flat or annular beds of catalyst, have the support screens or plates arranged in a manner that will permit enlargement of the catalyst zone from expansions due to temperature, or are such that there can be undesirable buckling and subsequent failure. The innumerable heating and cooling phases to which a converter is subjected in connection with automotive exhaust gas treating can also lead to catalyst settling and by-passing, particularly where the support screen can buckle or expand outwardly away from the retained catalyst bed.

It is thus an object of the present invention to provide a converter unit with an internally designed catalyst retaining section which will function under high temperature operating conditions in a manner to hold the catalyst in a non-settling bed.

It may be considered a further object of the invention to provide perforated retainer plates or screens for the catalyst bed which are of a dish shape and are arranged such that the screen expansion is controlled to preclude buckling and, at the same time, will hold the catalyst in a tight, packed-bed manner.

In a broad aspect, the present invention provides an improved catalytic converter of the type having a fixed or stationary bed of catalyst particles in a confined chamber and the gas inlet and gas outlet means thereto are arranged such that the aforesaid gas stream to be treated will pass through the catalyst bed, with the improvement in construction and arrangement comprising, supporting the catalyst particles between a set of spaced apart perforated members that each have a dished-shape, with one such member being positioned in communication with the gas inlet section of the chamber and curved outwardly from the retained bed of particles and the other curved inwardly toward the retained particles, whereby the particles will be held tightly in a non-settling manner when the unit is in operation and is subjected to expansion from high temperature gas conversion conditions.

It is not intended to limit the catalytic converter unit to any one external shape or cross section; however, the converter unit will generally be cylindrical or disc-like in shape with means being provided to pass the exhaust gas stream upwardly or downwardly through a central dished, disc-like catalyst section.

The use of the bowed screens or dish-shaped perforate plate means is more generally adaptable to retaining a relatively thin bed of catalyst particles which will be retained within the center portion of the converter unit in a manner to have the gas stream to be treated pass therethrough from one side to the other or in a vertical flow path. It is further contemplated within the scope of the present invention that the upstream screen member is bowed outwardly from the catalyst particles and toward the gas inlet section of the chamber, while the other (downstream) screen member is bowed inwardly in a direction toward the catalyst particles. Thus, the expansion or bowing of the particles retaining members will be such that one screen is away from the bed and the other in a direction which is toward the catalyst when the converter unit is subjected to high temperature. However, with the downstream screen being at the higher temperature from the catalytic conversion, there is a net effect of having a squeezing or expansion inwardly with respect to the retained catalyst particles and the latter are maintained in a non-settling substantially tight contact bed during operating periods, even with some side wall expansion occurring.

The screens or plate members are generally subjected to high temperature conditions, in a range which may be from approximately 600° F. to 1400° F., or more, by reason of the catalytic oxidation conditions and it is, therefore, necessary that the members be made of stainless steels or alloys which are temperature resistant and can accommodate expansion and contraction conditions over long periods of operation. The catalyst support members will also be provided of a screen mesh, or of perforated plate material, having perforations that are sized to preclude the loss of catalyst particles through the openings. Generally, the catalyst particles will be in a size range of from about 1/16" to about 1/4".

It is not intended to limit the present invention to the use of any one type of catalyst material inasmuch as suitable oxidation catalysts may include the metals of Groups I, V, VI and VIII of the Periodic Table, with copper, silver, vanadium, chromium, iron, cobalt, nickel, platinum and palladium being components of particular value. The components may be used singly or in combination where two or more active components are utilized on the support material. Generally, the support will be in the nature of pellets or spheres and will comprise alumina, silica-alumina, alumina with barium, calcium or other additive material such as zirconium, thoria, boria and the like.

Where the converter is to be utilized as a "catalytic converter muffler" for use with vehicle exhaust gases, then the unit may be placed in the exhaust line in the alternatively, it may be positioned more closely adjacent the engine and directly attachable to the exhaust gas manifold.

The modified design and construction of the present improved converter, as well as advantageous features in connection therewith, may be better set forth and explained by reference to the accompanying diagrammatic drawing and following description thereof.

FIG. 1 of the drawing is a sectional elevational view indicating a generally cylindrical form of converter unit.

Figure 2:
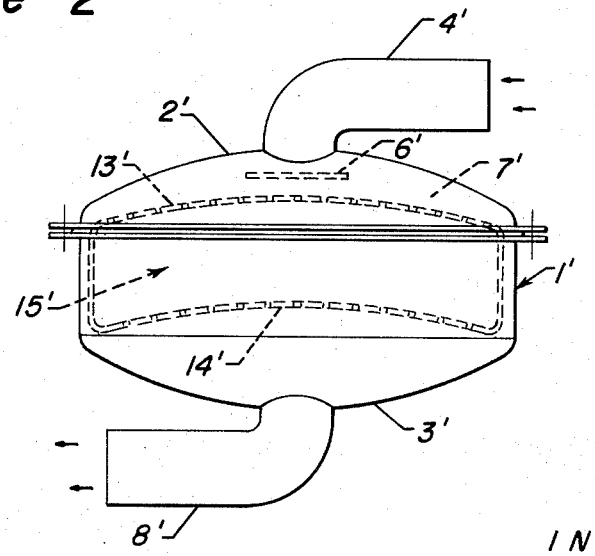

FIGURE 2 of the drawing is an elevational view of a converter unit merely indicating modified forms of gas inlet and gas outlet means.

Referring now particularly to FIG. 1 of the drawing, there is indicated a housing or chamber 1 having a generally cylindrical wall portion, and conical-form inlet and outlet sections 2 and 3. An inlet pipe member 4 extends through the central end portion of conical section 2 and is provided with side openings or slots 5 as well as an end baffle plate member 6, in order that the incoming exhaust gas stream will be diverted uniformly into a plenum zone or distribution area 7. Also at the outlet end of the converter, there is provided an outlet pipe section 8 having an inner section with holes or slots 9, as well as an end plate 10 in order to provide a treated gas outlet means from a gas collection zone 11 within the confines of the conical section 3.

Within the central portion of the chamber 1, the present embodiment provides a catalyst retaining container which is defined by a cylindrical wall section 12 and spaced apart perforate plate members 13 and 14. Both of the latter are formed to be dished-shaped and, as hereinbefore explained, each is formed and positioned in a special manner within the chamber so as to accommodate temperature expansion problems as well as insure the maintenance of a tightly packed catalyst bed. Specifically, the perforate plate member 13, which faces the inlet plenum 7 and the inlet port 4, shall be arched toward the plenum section 7 and in a convex arrangement with respect to the catalyst bed 15 maintained between the two perforated plates. On the other hand, the perforate plate member 14 which is downstream with respect to gas flow, is placed to be concave with respect to the catalyst bed 15 and is arched inwardly away from the gas outlet plenum section 11.

In the operation of the unit, the incoming gas stream through inlet port 4, even though it may be a relatively hot engine exhaust gas stream, such stream will by reason of the exothermic reactions taking place in bed 15 be of lower temperature than the product stream leaving bed 15 and passing downstream through plate 14. Thus, as a net result, the expansion of plate or screw 14 will be somewhat greater than that for perforate plate 13. Also, the greater expansion of the former member will tend to compensate for any voids or gradual reductions in volume of catalyst particles in bed 15 and will maintain the latter in a substantially tight compact condition during operating cycles.

It should also be pointed out that the dished-shapes for the perforate plate members 13 and 14 serve to provide structurally strong types of configurations which will require a minimum of stiffening or bracing, if any. In the present diagrammatic drawing, no stiffener ribs or bracing members are indicated; however, where deemed desirable for structural purposes, there may be the addition of stiffening and reinforcing to both plates 13 and 14.

As a matter of convenience in effecting the assembly, or disassembly, of the present converter unit, there may be a flange 16 extending outwardly and circumferentially around an edge portion of inner container wall 12 and, in addition, a flange section 17 from the wall portion of chamber 1 and a flange 18 from the upper circumferential edge of lower cone section 2 will provide a clamping and support means for the container flange 16. As will be obvious, this arrangement permits the inner catalyst retaining section to be tightly supported within chamber 1 as well as provide means for its removal and replacement when deemed necessary.

In FIG. 2 of the drawing, there is indicated diagrammatically a converter 1' which will have a central or middle body configuration that is similar to that shown in FIG. 1 of the drawing and in addition, may be provided with an inner catalyst retaining section 15' between perforate plate members 13' and 14' in an arrangement similar to that of FIG. 1. However, the present embodiment is provided with dome or dished-shaped end sections 2' and 3', rather than the conical-form end members of FIG. 1. There is also indicated the use of a horizontally positioned inlet pipe member 4' connected centrally with end cover section 2' and a horizontally oriented outlet pipe 8' connected centrally with downstream cover member 3'. A transverse baffle plate 6' in the inlet plenum 7' provides a means for distributing the inlet gas stream to the upstream perforate plate member 13' and into the catalyst bed 15'.

Still other modifications may be made in connection with the present improved form of catalytic converter with respect to gas inlet arrangements and gas outlet arrangements as well as with respect to baffling means, all of which may be considered within the broad scope of the present invention. However, in all instances, there shall be the utilization of the uniformly spaced apart dished perforate plate members such as 13' and 14' to provide the confined catalyst bed for effecting the conversion of the gas stream to be treated and there convex positioning toward the gas inlet end of the unit. At the same time, the dished plates provide strength and rigidity for optimum expansion characteristics with respect to the catalyst bed and the action of the incoming gas stream so as to provide a converter which is particularly adapted to conform to high temperature exothermic conditions.

Although not indicated in the present drawing, one or more suitable catalyst fill-plugs may be utilized in combination with the internal catalyst retaining container such that catalyst may be added to such container or removed and replaced.

For illustrative purposes, the present embodiments have been shown in a simplified manner, however, where desired still further external designs or configurations may be utilized and should be obvious to those skilled in the converter-muffler arts. Also, where it is deemed desirable for operating characteristics, insulation may be provided around the chamber in order to retain heat within the interior of the converter unit and enhance the oxidation reactions to be carried out therein. In still other instances, it may be desirable to have a weatherproof casing around the insulation which in turn surrounds the actual converter chamber.

I claim as my invention:

1. In a catalytic converter unit having a stationary bed of catalyst particles in a confined chamber and gas inlet and outlet means thereto that are arranged to pass the gas stream to be treated through the catalyst bed, the improved construction and arrangement which comprises, supporting the catalyst particles between a set of spaced perforated members that each have a dished shape, one such member being positioned in the chamber adjacent the gas inlet section thereof and curved outwardly with respect to the retained bed of particles and the other curved inwardly toward said bed, whereby such particles are held tightly in a non-settling manner when the unit is subjected to expansion from high temperature gas conversion conditions.

2. The converter unit of claim 1 further characterized in that the converter chamber is of circular form and is provided in two sections, with each of such sections having a peripheral flange to provide means for a flanged connection between the two sections.

3. The converter unit of claim 1 further characterized in that said confined chamber is of a generally circular shape and the spaced apart opposing perforate members with the curved dish-shaped configuration effect the retention of a resulting substantially dish-shaped bed of particles therein.

4. The converter unit of claim 1 further characterized in that said catalyst bed is confined within an inner container formed by said spaced apart dished perforated members and by a cylindrical wall section which connects between the peripheries of said perforated members, and a peripheral flange around said inner catalyst container connects with said chamber to support it therein.

References Cited
UNITED STATES PATENTS

| | | | |
|---|---|---|---|
| 3,567,403 | 3/1971 | Perga | 23—288 F |
| 3,041,149 | 6/1962 | Houdry | 23—288 F |

JOSEPH SCOVRONEK, Primary Examiner